United States Patent
Sasaki et al.

[11] Patent Number: 5,927,171
[45] Date of Patent: *Jul. 27, 1999

[54] BENCH CIRCULAR SAW MACHINE

[75] Inventors: Katsuhiko Sasaki, Anjo; Masahiro Satou, Tobishima-mura, both of Japan

[73] Assignee: Makita Corporation, Anjo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/658,073

[22] Filed: Jun. 4, 1996

[30] Foreign Application Priority Data

Jun. 5, 1995 [JP] Japan ................................. 7-138177

[51] Int. Cl.$^6$ ................................. B26D 7/18; B27B 5/29
[52] U.S. Cl. ................................. 83/165; 83/100; 83/478; 83/490; 83/522.26; 83/581
[58] Field of Search ................................. 83/100, 165, 397, 83/471.2, 471.3, 478, 490, 522.18, 522.19, 581, 98, 522.26

[56] References Cited

U.S. PATENT DOCUMENTS

| | | | |
|---|---|---|---|
| 3,262,471 | 7/1966 | McCarty | 83/522.19 X |
| 3,322,169 | 5/1967 | Hilliard | 83/100 |
| 3,958,474 | 5/1976 | Kreitz | 83/100 |
| 4,253,362 | 3/1981 | Olson | 83/100 |
| 4,875,398 | 10/1989 | Taylor et al. | 83/100 |
| 4,972,749 | 11/1990 | Grove | 83/522.18 X |
| 5,054,352 | 10/1991 | Fushiya et al. | 83/471.3 X |
| 5,063,802 | 11/1991 | Shiotani et al. | 83/98 |
| 5,197,365 | 3/1993 | Clifton | 83/522.19 X |
| 5,421,228 | 6/1995 | Fukinuki | 83/471.3 |
| 5,445,056 | 8/1995 | Folci | 83/100 |
| 5,495,784 | 3/1996 | Chen | 83/522.19 X |

FOREIGN PATENT DOCUMENTS 3-108401  11/1991  Japan .
3-112301  11/1991  Japan .

*Primary Examiner*—Clark F. Dexter
*Attorney, Agent, or Firm*—Pillsbury Madison & Sutro LLP

[57] ABSTRACT

A bench circular saw machine for cutting a material including a base upon which the material is supported, an arm interconnected to the base, a tube member, and a main body having a circular saw for cutting the material and a motor operatively associated with the circular saw for driving the circular saw. The main body is pivotally supported on the arm such that the main body can be pivoted toward the base and the circular saw can cut the material. The main body has a discharge port through which sawdust formed by the circular saw during a cutting operation is discharged from the main body. The tube member is disposed adjacent to the discharge port and is associated with the discharge port so as to guide the sawdust into the discharge port. The tube member is also pivotable relative to the material such that an angle of the tube member relative to the material can be varied.

9 Claims, 5 Drawing Sheets

BENCH CIRCULAR SAW MACHINE

FIELD OF THE INVENTION

The present invention relates to a bench circular saw machine that comprises a base on which a material to be cut is held, a support arm disposed behind the base, and a main body, having a circular saw, that is disposed in front of the arm and is allowed to pivot in an upward-downward direction.

BACKGROUND OF THE INVENTION

A discharge port for sawdust is formed behind the circular saw of the main body in the machine. A sawdust accommodating bag, a sawdust accommodating element or the like is connected with the discharge port through which the sawdust propelled rearward from the circular saw is collected into the sawdust accommodating bag. It is disclosed in JP-A 3(1991)-108401(Utility Model) and JP-A 3(1991)-112301 (Utility Model) that a machine comprises a guide plate for guiding the sawdust to a discharge port thereof. The guide plate is rotatably disposed under the main body, and the guide plate has a U shape cross-section. The guide plate is raised for contacting a material to be cut in a case where the material is thick. An inclination angle of the guide plate is thereby variable to improve collection efficiency of the sawdust.

In the above-mentioned machine, however, there is a large possibility of damaging the material to be cut due to contact between the guide plate and the material. The damage to the material may be aggregated, in particular, by a slide type bench circular saw machine that is driven as sliding the main body and guide plate on the material.

Furthermore, sawdust directed into the guide plate at an angle deviated from the angle of the guide plate may be directed on a out through an open side of the plate because of the plate U shape cross section of the plate. This sawdust is not guided into the sawdust accommodating bag. It can not be expected to improve collection efficiency of the sawdust.

Improved sawdust guiding elements are shown in U.S. Pat. Nos. 5,063,802 and 5,445,056.

SUMMARY OF THE INVENTION

It is therefore an object of the present invention to provide a bench circular saw machine that has an improved collection efficiency of the sawdust without a possibility of damaging a material to be cut.

The machine according to the present invention includes a base on which the material to be cut is supported, a main body, supported on the base or on a turn table which is disposed on around the base in a rotatable manner, having a circular saw for cutting the material and a motor for driving the circular saw, a hinge for supporting the main body in a rotatable manner, a discharge port formed behind the circular saw of the main body, a tube member for guiding the sawdust into the discharge port, wherein the tube member is pivotally disposed to enable the inclination of the tube to be varied in a rearward-backward direction.

Furthermore, an opening of a lower edge of the tube member may be formed as inclining forward and facing toward the circular saw.

Additionally, it is possible to change an angle of the tube member according to a graduation on the main body.

Yet, furthermore, it is possible to have the main body slide on the turn table in a forward-rearward direction with the hinge.

The sawdust is collected effectively by the tube member by adjusting the inclination angle of the tube member with respect to a path of the exiting sawdust.

The tube member is configured so that the tube member transfers the sawdust that is collected at an angle slightly deviated from the right its thereof. The tube member is independently variable in angle thereof so that it is not in contact with the material to be cut. Therefore, the material is never damaged.

The width of the opening of the tube member can be effectively widened by arranging the lower edge of the tube member at a forward inclination, that is, arranging the lower edge of the tube member so that the lower edge faces the circular saw.

It is furthermore possible to adjust the angle of the tube member quickly and correctly with respect to thickness or the like of the material to be cut by having the angle of the tube member vary in angle with regard to the graduation on the main body.

In a case where the main body is disposed on a turn table and is able to slide in a forward-rearward direction, the tube member is not in contact with the material to be cut so that the material is never damaged by the sliding.

BRIEF DESCRIPTION OF THE DRAWINGS

The present invention is illustrated in the accompanying drawings, in which.

DESCRIPTION OF THE PREFERRED EMBODIMENTS

An embodiment of the present invention is described hereinbelow with regard to the attached drawings.

Figure 1:
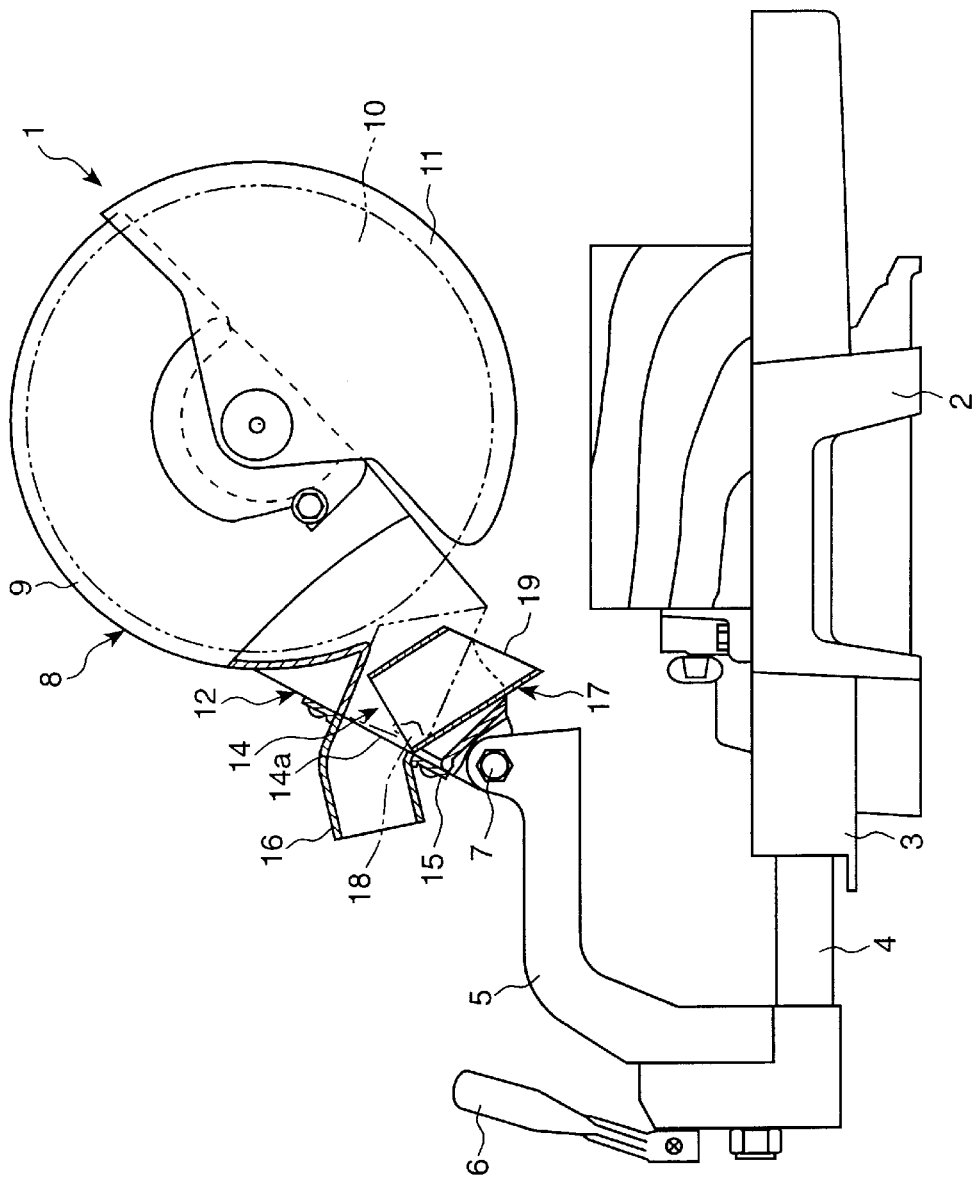
FIG. 1 is an elevational view of a bench circular saw machine in accordance with an embodiment of the present invention.

FIG. 1 is an elevational view of a bench circular saw machine 1, shown in a slide-type configuration. A turn table 3 is disposed around a base 2. A slide bar 4 is inserted into the turn table 3 and is allowed to slide in a forward-rearward direction (description will be made hereinbelow as the forward direction is the right direction of FIG. 1 and the rearward direction is the left direction). A movable arm 5 is disposed at the rear end of the slide bar 4. The arm 5 is allowed to move in the forward-rearward direction together with the slide bar 4 and to rotate in a circumferential direction about the slide bar 4. Position of the movable arm 5 in the circumferential direction with respect to the turn table 3 is desirably set by handling a fixing lever 6 behind the arm 5.

A main body 8 is rotatably disposed at a front end of the arm 5 such that the main body 8 can move in an upward-downward direction about a support element 7. The main body 8 comprises a circular saw 10 driven by a motor not shown, a blade case 9 for protecting the saw 10 and a safety cover 11. The main body 8 is continuously biased in the upward direction by a torsion spring (not shown) provided on the support element 7.

The blade case 9 has a body portion 12 in which a guide pass 14 for sawdust is formed therethrough in the upward-downward direction. A connecting plate 15 is connected to an upper opening 14a as a discharge port of the guide pass 14. The plate 15 supports a cylindrical elbow 16 in a rotatable manner. The elbow 16 is so designed to allow a hose from a sawdust accommodating bag or the like to connect thereto.

Figure 2:
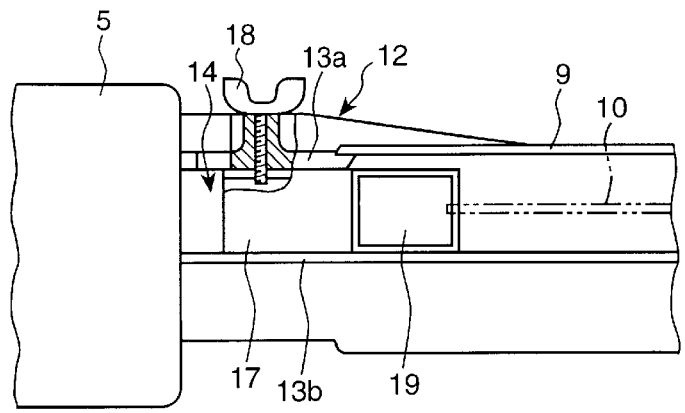
FIG. 2 is a view of explaining a guide tube.

FIG. 2 shows a configuration viewed downward from the body portion 12. A guide tube 17 of a rectangular cross-section is provided in the guide pass 14. A width between a left end and a right end of the tube 17 is almost equal to a distance between a left wall 13a and a right wall 13b of the body portion 12 and a width between a front end and a rear end of the tube 17 is almost equal to a diameter of the elbow 16. An upper portion of the guide tube 17 together with the wall 13a of the body portion 12 is screwed by a thumbscrew 18. A lower end of the guide tube 17 can be rotated in the forward-rearward direction around the thumbscrew 18 as a center as loosening the thumbscrew 18 and is fixed at a desirable angle by tightening the thumbscrew 18. The lower end of the guide tube 17 is formed in an inclined shape to configure an opening 19 that faces the circular saw 10. The opening 19 therefore has a wide area facing the saw 10, so that the opening 19 can easily to collect the sawdust.

The bench circular saw machine 1 thus configured is driven as follows. When a handle (not shown) of the main body 8 is pulled down, pivots downwardly the main body 8 about the support element 7 to cut the material on the turn table 3 with the circular saw 10. In a case where the material has a wide width in the forward and backward direction, the main body 8, together with the slide bar 4 and movable arm 5, is moved forward by manipulating the handle to start the cutting operation.

Figure 3:
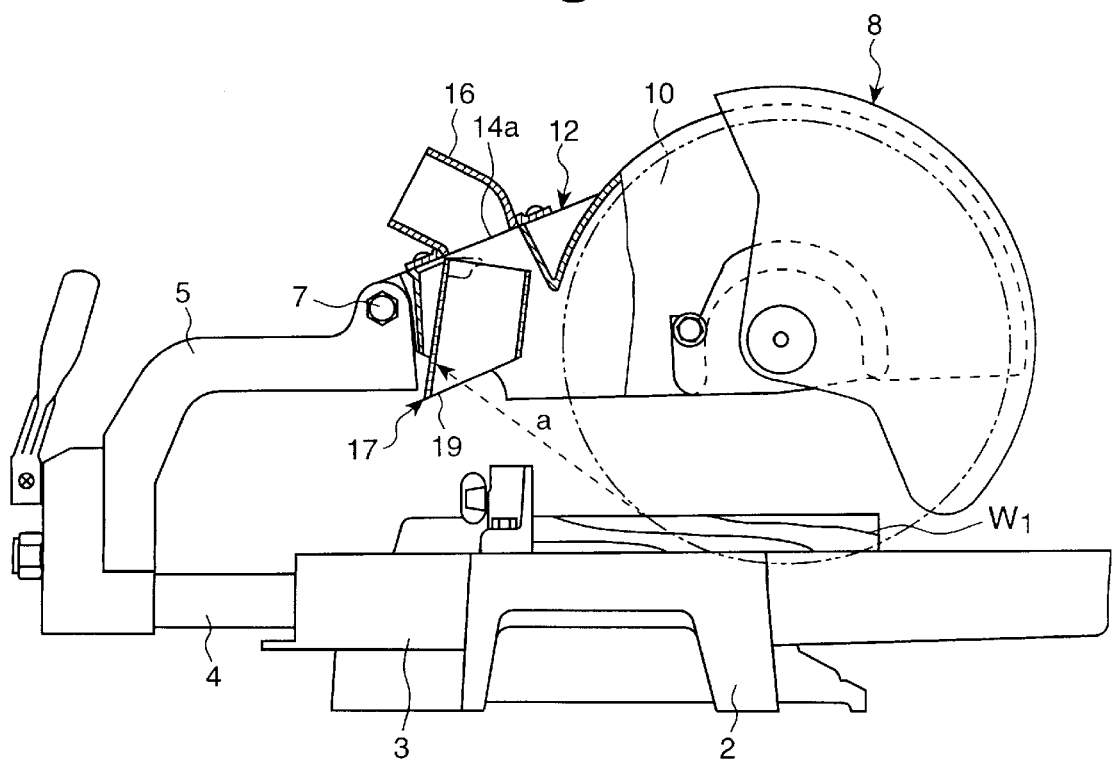
FIG. 3 is an elevational view of the machine where the inclination angle of the guide tube is varied according to a thin material.
Figure 4:
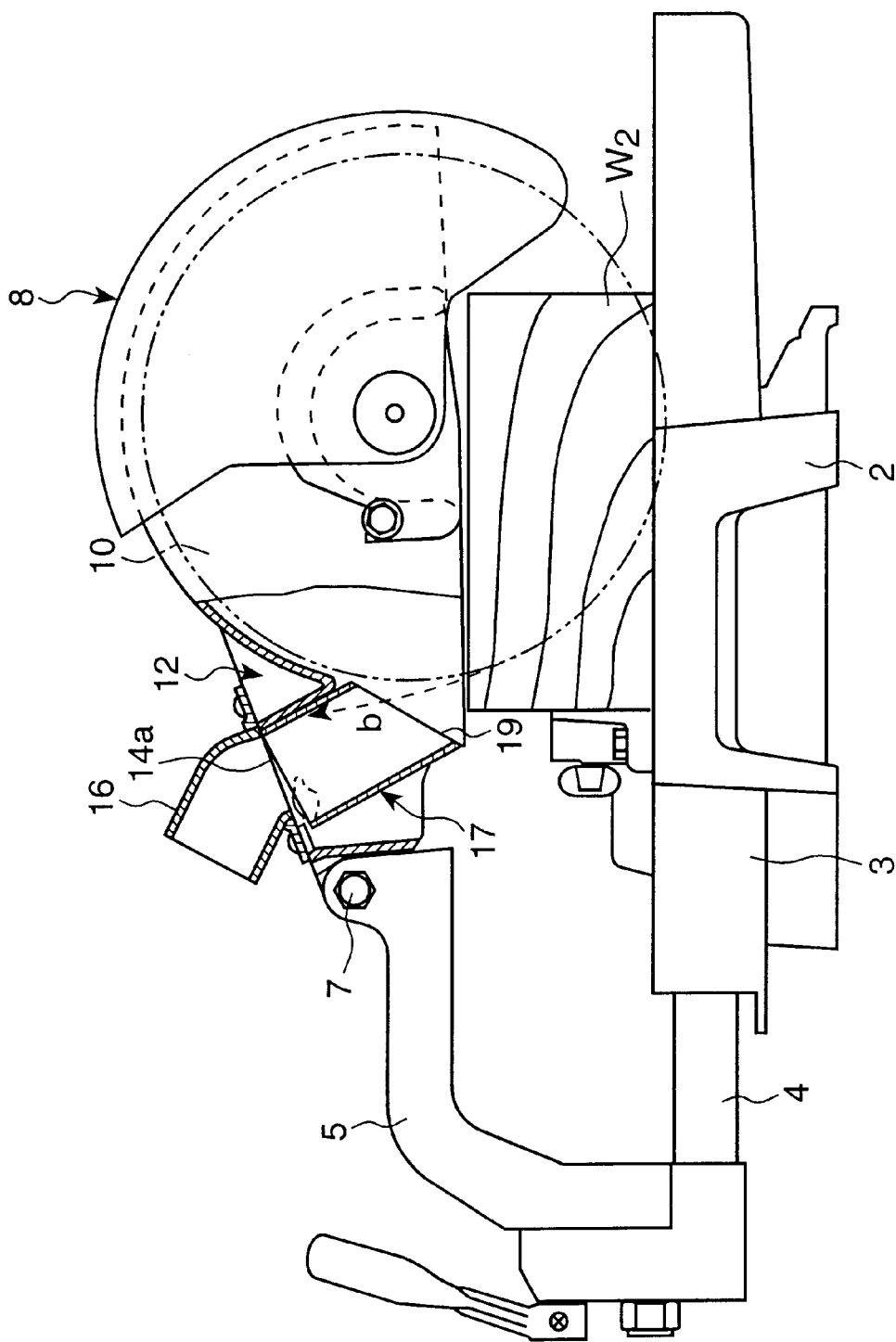
FIG. 4 is an elevational view of the device where the inclination angle of the guide tube is varied according to a thick material.

The flying direction of the sawdust varies depending on thickness of the material to be cut in the cutting operation. As shown in FIG. 3, the sawdust flys in the direction shown by an arrow "a" when the material is relatively thin, whereas as shown in FIG. 4, the sawdust flys in the direction shown by an arrow "b" when the material is relatively thick. Therefore, when the relatively thin material (the arrow a) is subjected to cutting, as shown in FIG. 3, first loosening the thumbscrew 18 to move the lower end of the guide tube to the rearmost position of the guide pass 14 and thereafter tightening the thumbscrew 18 is diserable. Almost all the sawdust is collected through the opening 19 and is guided towards the elbow 16 through which the sawdust is directly collected and into the sawdust accommodating bag. On the other hand, when the relatively thick material (the arrow b) is subjected to cutting, as shown in FIG. 4, the lower end of the guide tube 17 is moved forward and the guide tube 17 is fixed at the position where the opening 19 is nearest to the circular saw 10. The sawdust is collected by the opening 19 and is guided through the guide tube 17, of which direction is almost consistent with the direction of sawdust's path, to the elbow 16 and is collected into the sawdust accommodating bag. In this embodiment, as mentioned above, the guide tube 17 is variable in angle at the position where it will not in contact with the material to be cut. The sawdust collecting operation is performed effectively without damaging the material to be cut by adjusting the angle of the guide tube 17 to the direction of the sawdust's path. Particularly, as the guide tube 17 is constructed as a tube member that has an even or constant cross section, the sawdust collected into the opening 19 is guided towards the elbow 16 regardless of the sawdust's entrance angle with respect to the opening 19.

Figure 5:
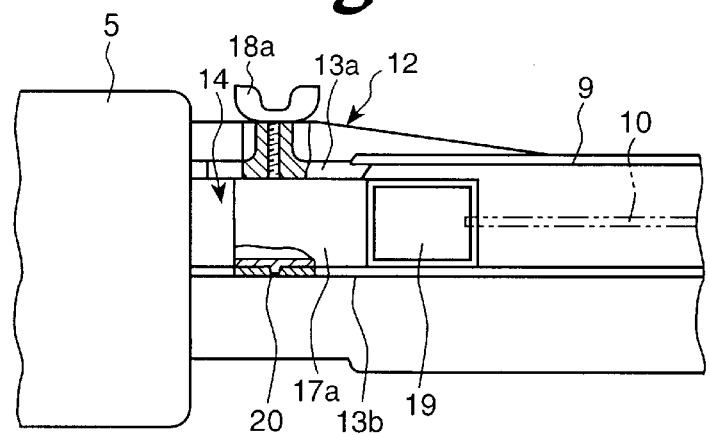
FIG. 5 is a view of explaining another guide tube.

In the embodiment mentioned above, the guide tube 17 has a rectangular cross section. The guide tube 17 may be configured as another polygonal cross section or a cylinder. The fixing means of the guide tube 17 shown in FIG. 5 can be used as well as the thumbscrew 18. In FIG. 5, a screw member 18a such as a thumbscrew is so screwed into a wall 13a of the body portion 12 so as to permit the screw member 18a to press and fasten one side of the guide tube 17a by a top end of the screw member. A projection portion 20 is formed from the other side of the guide tube 17a fitted into a recess of the other wall 13b of the body portion 12. Other types of fixing means, such as a rivet or the like that supports the guide tube in rotatable manner and around which the guide tube rotates, can be utilized.

Furthermore, rotational operation of the guide tube becomes easy by forming an arc like slit on one of or each of the walls of the body portion and disposing a projection member on a side or each side of the guide tube that penetrates through the slit.

In the embodiment, the guide tube is separated from the elbow and is able to rotate. It is possible to construct the guide tube and the elbow as a single piece wherein and the piece is rotated by the rotation means mentioned above. In this case, the inclination angle of the guide tube is varied by means of the elbow by gripping and moving it and the number of the elements is thus reduced to achieve a rationalal structure.

Next, an embodiment in which angle of the guide tube is varied in a more preferable manner.

Figure 6:
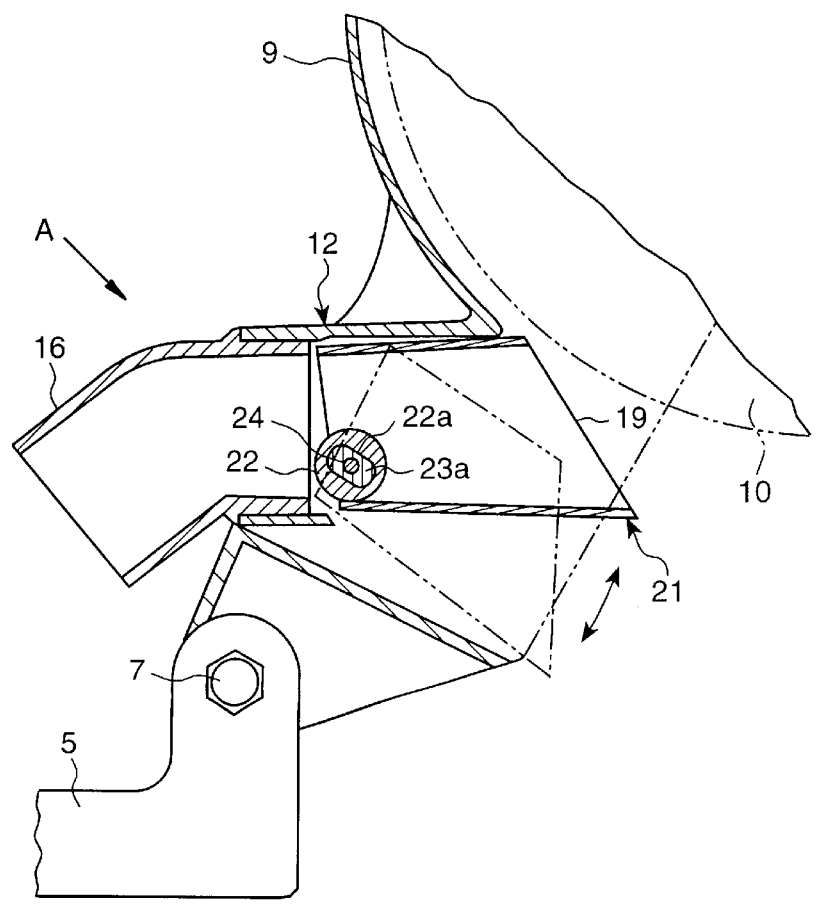
FIG. 6 is a view of explaining another guide tube.
Figure 7:
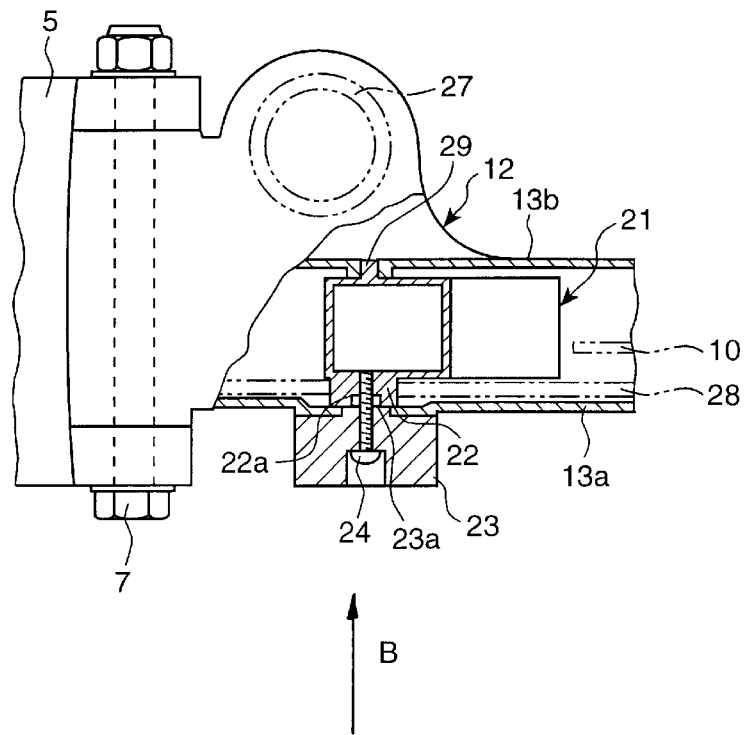
FIG. 7 is a view, partially in section, taken from a direction shown by an arrow A in FIG. 6.
Figure 8:
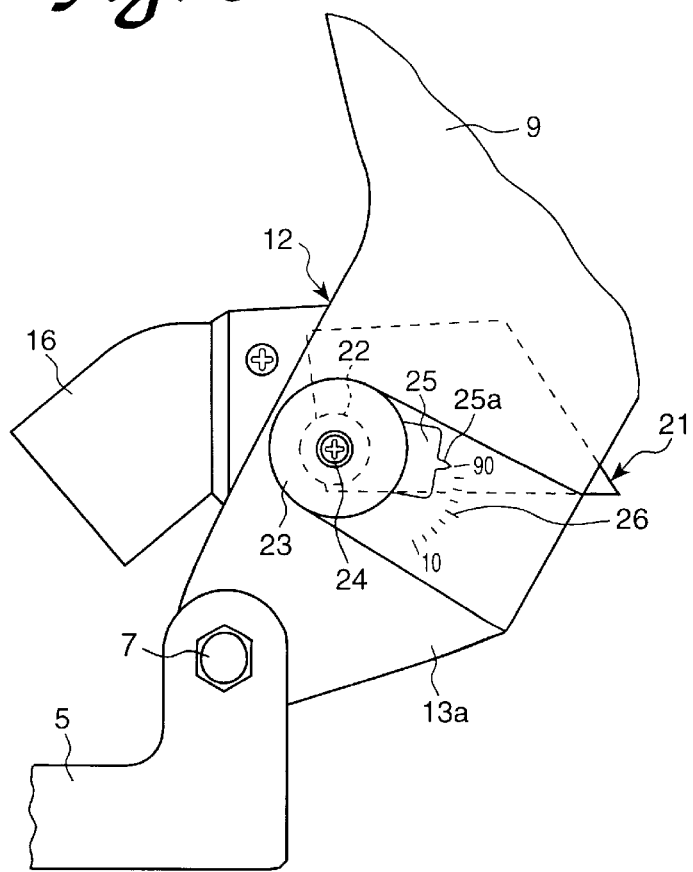
FIG. 8 is a view taken from a direction shown by an arrow B in FIG. 7.

FIG. 6 is a view of the body portion 12. FIG. 7 is a view taken along an arrow A in FIG. 6. FIG. 8 is a view taken along an arrow B in FIG. 7. A tube portion 22 is projected from a side of a guide tube 21 disposed in the body portion 12 as shown in FIGS. 6 and 7. A tube like knob 23 is disposed outside the body portion 12 and is coaxial with the tube portion 22. A connecting recess portion 22a determined by two surfaces is grooved in the tube portion 22 as shown in FIG. 6. On the other hand, a connecting projection portion 23a determined by two surfaces is bulged directing to the connecting recess portion 22a. The tube portion 22 and the knob 23 are fixed by fitting the connecting recess portion 22a and the connecting projection portion 23a. A boss 29 is projected from a guide tube 21 on a side opposite to the tube portion 22. The boss 29 is loosely inserted into a wall 13b of the body portion 12. A screw 24 is so provided to penetrate through the tube portion 22 from the knob 23 and the screw 24 is coaxial with the boss 29. The angle of the guide tube 21 is varied as rotating around the screw 24 as a center. The rotation of the guide tube 21 is conjoint with the rotational operation of the knob 23. A female screw portion engaging to the screw 24 is only formed at the tube portion 22 of the guide tube 21. A flange 25 having an indicator 25a is extended from the knob 23 as shown in FIG. 8 that is viewed along the arrow B in FIG. 7. On the other hand, graduations 26 indicating thickness (10 to 90 mm in the embodiment) of the material to be cut is formed on an outer surface of the wall 13a of the body portion 12. The graduations 26 indicates a position to which the knob 23 should be rotated. Numeral 27 in FIG. 7 depicts a compression spring that biases the main body upward. Numeral 28 depicts a linkplate connecting to the safety cover 11 and the linkplate 28 makes the safety cover 11 open as the main body goes down.

According to the present embodiment, the screw 24 is loosened to change the angle of guide tube 21. When an operator grips the knob 23 and rotates the indicator 25a toward the graduation 26 indicating the thickness of the material to be cut, the guide tube 21 then rotates conjointly, an angle of the guide tube 21 preferable to the thickness of the material to be cut is set automatically. Thereafter, the guide tube 21 is fixed by tightening the screw 24. That is, the guide tube 21 moves toward the knob 23 due to engagement between tube portion 22 and the screw 24 and rotation of the screw 24. The wall 13a is then pinched between the tube portion 22 and knob 23 and the guide tube 21 and knob 23 are fixed at this position. As mentioned above, the rotational operation of the guide tube 21 is carried out by the knob 23 and additionally angle adjustment with regard to the thickness of the material to be cut is carried out quickly and correctly.

Configuration of the guide tube 21 of the embodiment shown in FIGS. 6 to 8 can be modified if it had a polygonal cross section. In the above-mentioned embodiments, the bench circular saw machine of the slide type having the movable arm is shown to explain the present innovation. The present invention, as a matter of course, can be applied to a bench circular saw machine in which the stationary arm is projected from the turn table.

Although the invention has been disclosed in the context of certain preferred embodiments, it will be understood that the present invention extends beyond the specifically disclosed embodiments to other alternative embodiments of the invention. Thus it is intended that the scope of the invention should not be limited by the disclosed embodiments, but should be determined by reference to the claims that follow.

What is claimed is:

1. A bench circular saw machine for cutting a material, comprising:

a base upon which the material can be supported;

an arm interconnected to the base;

a main body, having a circular saw for cutting the material and a motor operatively interconnected to the circular saw for driving the circular saw, the main body being pivotally supported on the arm such that the main body is pivotable toward the base thereby allowing the circular saw to engage the material;

the main body having a discharge port through which sawdust formed by the circular saw during a cutting operation is discharged from the main body; and a tube member disposed adjacent to the discharge port and in a path extending between the discharge port and the circular saw so as to guide the sawdust into the discharge port, wherein the tube member is pivotable relative to the circular saw such that an angle of the tube member relative to the circular saw can be varied.

2. A bench circular saw machine according to claim 1, wherein an opening of an end of the tube member is inclined relative to a longitudinal axis of the tube member.

3. A bench circular saw machine according to claim 2, further comprising a graduated scale disposed on the main body and an indicator disposed on the scale, wherein the indicator is coupled to the tube member such that an inclination of the tube member is indicated on the scale by the indicator, wherein graduations on the scale correspond to a thickness of the material.

4. A bench circular saw machine according to claim 2, wherein the arm is slidably interconnected to the base thereby allowing the main body to move in a transverse direction relative to the base.

5. A bench circular saw machine according to claim 1, further comprising a graduated scale disposed on the main body and an indicator disposed on the scale, wherein the indicator is coupled to the tube member such that an inclination of the tube member is indicated on the scale by the indicator, wherein graduations on the scale correspond to a thickness of the material.

6. A bench circular saw machine according to claim 5, wherein the arm is slidably interconnected to the base thereby allowing the main body to move in a transverse direction relative to the base.

7. A bench circular saw machine according to claim 1, wherein the arm is slidably interconnected to the base thereby allowing the main body to move in a transverse direction relative to the base.

8. A bench circular saw machine according to claim 1, further comprising a turntable rotatably disposed on the base, said turntable being rotatable about an axis extending generally vertically from the base.

9. A bench circular saw machine according to claim 1, wherein the tube member is pivotally disposed on the main body adjacent to the discharge port.

* * * * *